(12) United States Patent
Ni et al.

(10) Patent No.: US 7,577,778 B2
(45) Date of Patent: Aug. 18, 2009

(54) EXPANDABLE STORAGE APPARATUS FOR BLADE SERVER SYSTEM

(75) Inventors: Hsiao-Tsu Ni, Hsinchuang (TW); Chin-Lung Su, Taipei (TW); Ying-Che Chang, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 396 days.

(21) Appl. No.: 11/446,299

(22) Filed: Jun. 5, 2006

(65) Prior Publication Data

US 2007/0094531 A1   Apr. 26, 2007

(30) Foreign Application Priority Data

Oct. 20, 2005   (TW) ............................... 94136777 A

(51) Int. Cl.
*G06F 13/38* (2006.01)
*G06F 13/00* (2006.01)

(52) U.S. Cl. ........................................ 710/74; 711/114

(58) Field of Classification Search ............. 710/33–35, 710/72–74; 711/100–116

See application file for complete search history.

(56) References Cited

U.S. PATENT DOCUMENTS

| | | | |
|---|---|---|---|
| 6,000,020 A * | 12/1999 | Chin et al. | 711/162 |
| 7,281,243 B2 * | 10/2007 | Rothman et al. | 717/163 |
| 7,437,462 B2 * | 10/2008 | Marks et al. | 709/226 |
| 2004/0117522 A1 * | 6/2004 | Loffink et al. | 710/74 |
| 2004/0210898 A1 * | 10/2004 | Bergen et al. | 718/100 |
| 2004/0243745 A1 * | 12/2004 | Bolt et al. | 710/68 |
| 2005/0177678 A1 * | 8/2005 | Jamp et al. | 711/100 |
| 2006/0143612 A1 * | 6/2006 | Cromer et al. | 718/100 |
| 2006/0265449 A1 * | 11/2006 | Uemura et al. | 709/203 |
| 2007/0083707 A1 * | 4/2007 | Holland et al. | 711/114 |
| 2008/0126849 A1 * | 5/2008 | Kotzur et al. | 714/7 |
| 2008/0141236 A1 * | 6/2008 | Buckler et al. | 717/168 |

FOREIGN PATENT DOCUMENTS

| | | |
|---|---|---|
| CN | 1504891 A | 6/2004 |
| CN | 2713534 Y | 7/2005 |
| CN | 2718666 Y | 8/2005 |

* cited by examiner

*Primary Examiner*—Christopher B Shin
(74) *Attorney, Agent, or Firm*—Rabin & Berdo, PC

(57) ABSTRACT

An expandable storage apparatus for a blade server system is provided. In one preferred embodiment of the invention, the storage apparatus inserted within a blade server system comprises a storage system for storing desired information which can be accessed by the blade server system; a control module to control access to information stored in the storage system; and a connector being connected to a middle plane of the blade server system, wherein the storage apparatus is effectively coupled through an input/output module and a middle plane to a blade server within a single blade server system eliminating the need to connect the blade server system to an external storage system.

20 Claims, 2 Drawing Sheets

US 7,577,778 B2

EXPANDABLE STORAGE APPARATUS FOR BLADE SERVER SYSTEM

RELATED APPLICATIONS

The present application is based on, and claims priority from, Taiwan Application Serial Number 94136777, filed Oct. 20, 2005, the disclosure of which is hereby incorporated by reference herein in its entirety.

BACKGROUND

1. Field of Invention

The present invention relates to a blade server system. More particularly, the present invention relates to an expandable storage apparatus for a blade server system.

2. Description of Related Art

With the rapid development of various technologies and the pervasiveness of computer dependency in enterprise, the market demand for server systems is rising. Due to the growth in business, larger companies usually use tens of or hundreds of low-cost servers or blade servers in order to deal with a great number of data or Internet traffic. The so-called "Server Blade" refers to an entire server designed to fit on a small plug-and-play card or board (CPUs, RAM or hard drives are usually included thereon). A server blade represents a server. Several blades can be installed in one rack, sharing the same power supplies, monitor, keyboard and other electronic components while offering potentially easier maintenance. Several servers can be further set in a rack chassis, integrating all server blades while enabling users to efficiently and rapidly access them.

Blade servers are notable for their reliability and scalability. Since the server rack and the blade server are designed to be hot-swappable, when one of the blade servers is out of service, the blade server can be simply removed without shutting down the system. In other words, blade servers can replace much larger, more traditional server installations, allowing the consolidation of sprawling server farms into a few super-dense racks. Meanwhile, the computing capacity is also increased if more blade servers are included and properly used.

Although the blade server is provided with hard drive(s) for storing information, storage capabilities are limited by the size of the drive. Modern applications require increasingly large storage areas to store data and associated information. To increase the overall storage capacity, blade server systems are typically connected to independent storage system(s) for better storage capabilities, which might, however, result in unnecessary lines and occupy too much space. In addition, for most smaller enterprises, a blade server rack (for example, a rack with 14 slots in which three to five blade servers were used may be sufficient to fully handle the required processes. However, the remaining 9 slots would thus be left idle—while an external storage system is still needed.

SUMMARY

It is therefore an objective of the present invention to provide an expandable storage apparatus for a blade server system, in which the storage apparatus is designed to be compatible with a standard rack and be able to interface with server blades so that it can be connected directly to the blade server system and saving the blade serve system from having to connect to external storage system(s), thereby saving space and minimizing the amount of external lines required.

In one aspect of the present invention, a storage apparatus inserted within a blade server system comprises a storage system to store the desired information which can be accessed by the blade server system; a control module to control the storage system accessing information; and a connector being connected to a middle plane of the blade server system, wherein the storage apparatus is effective in one system with a blade server through an input/output module and the middle plane installed within the blade server system, without having the need to connect to an external storage system.

In another aspect of the present invention, a blade server system comprises a server rack, at least one blade server inserted within the server rack, and at least one expandable storage apparatus inserted within the server rack, wherein the expandable storage apparatus comprises a storage system to store the desired information which can be accessed by the blade server system; a control module to control the storage system accessing information; and a connector connected to a middle plane of the blade server system, wherein the storage apparatus is effectively coupled through an input/output module and a middle plane to a blade server within a single blade server system eliminating the need to connect the blade server system to an external storage system.

Other aspects and advantages of the invention are more fully apparent from the ensuing disclosure, appended claims and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is thought that elements and features of one embodiment may be beneficially incorporated in other embodiments without further recitation.

DESCRIPTION OF THE PREFERRED EMBODIMENTS

Figure 1:
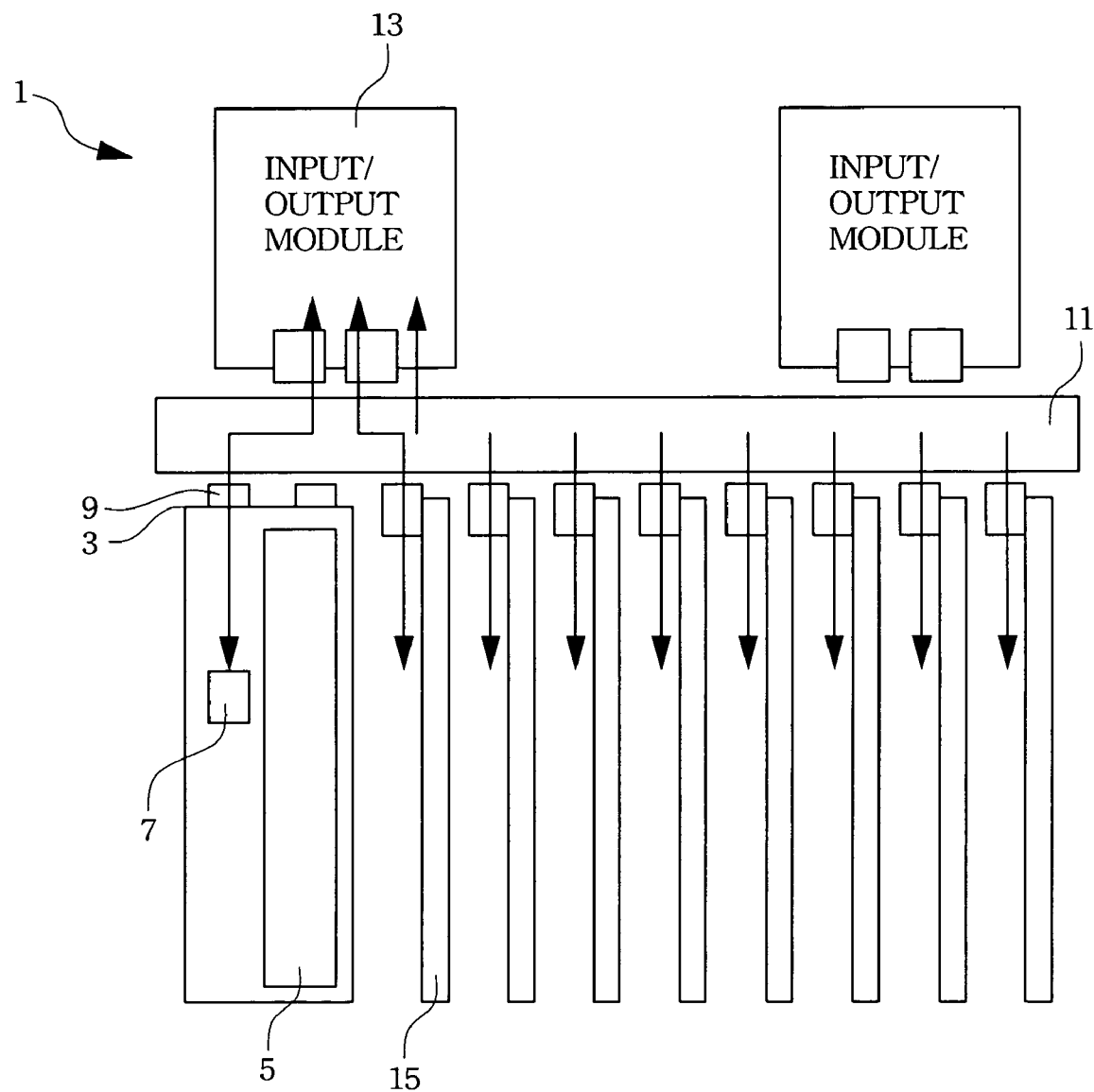
FIG. 1 is a schematic view of an expandable storage apparatus inserted within the blade server in accordance with one embodiment of the present invention.

Reference is now made in detail to the present preferred embodiments of the invention, examples of which are illustrated in the accompanying drawings. Wherever possible, the same reference numbers are used in the drawings and the description to refer to the same or like parts.

FIG. 1 shows a schematic view of an expandable storage apparatus 3 inserted within the blade server system 1 in accordance with one embodiment of the present invention. The expandable storage apparatus 3 comprises storage system 5 to store desired information which can be accessed by the blade server system 1; a control module 7 to control access to information stored in the storage system; and a connector 9 being connected to a middle plane 11 of the blade server system 1, wherein the expandable storage apparatus 3 is effectively coupled through an input/output module 13 and a middle plane 11 to a blade server 15 within a single blade server system 1 eliminating the need to connect the blade server system 1 to an external storage system.

In general, the blade server system design is based on the number of "blade slots." The server rack and the blade server have various standards and sizes. It should be noted that the configuration shown in FIG. 1 is illustrative of one embodiment. Other configurations, sizes or blade densities should be readily apparent to those skilled in the art.

In one embodiment of the present invention shown in FIG. 1, the expandable storage apparatus 3 possesses the same type, outline and interface as the blade server 15 so that it can be inserted into and is compatible with the blade server chassis. The function of the expandable storage apparatus 3 is primarily to store the same desired information as the external storage systems. The expandable storage apparatus 3 includes a storage system 5, which could be a JBOD (Just a Bunch of Disks) system. The so-called "JBOD" is a concept combining multiple physical disk drives into a single virtual disk. JBOD is akin to reverses partitioning and strings two or more physical drives together to create one logical drive, in order to store larger amounts of data or information.

In another embodiment of the present invention, the storage system 5 could be a RAID (Redundant Arrays of Independent Disks) system. RAID is a category of disk drives that employ multiple independent hard drives combined to form one large logical array. Data is stored on this array of disks with additional redundancy information. The redundancy information may be the data itself or parity information calculated out of several data blocks. When one disk fails, the missing data is recalculated from the data that remains available and from the parity information. No matter which storage standard is adopted, the storage system should be effective in storing the desired information. The standard and architecture of the storage system described herein is not limited to the above. Rather, any storage system having different standards can be applied so long as the architecture and the interface of the storage system and the expandable storage apparatus are compatible with each another.

The expandable storage apparatus 3 also includes a control module 7 to control access to information stored in the storage system 5. The control module 7 in conjunction with an input/output module 13 (herein considered as a bridge) provides a data-transferring path to integrate the input/output data. The input/output module 13 is connected to a remote computer (not shown) and blade server 15. The input/output module 13 may include a control unit to receive access instructions from a remote computer or blade server 15, through which (i.e., the module 13) the instruction is transferred to the control module 7 to access files or information in storage system 5. The needed information is then transferred to the blade server 15 or the remote computer. The input/output module 13 is capable of controlling at least one blade server 15 in the blade server system 1, in a similar way to control module 7. In one aspect of the present invention, the blade server system 1 comprises at least one input/output module 13. When the primary input/output module fails to function, the remaining input/output modules (for backup) may continue to maintain the service.

The expandable storage apparatus 3 of the present invention also includes a connector 9 with an expansion slot interface and hot-swap support. The expandable storage apparatus 3 and the blade server 15 are designed to support hot-swapping allowing failed drives or storage apparatus to be replaced with new drives without having to shut down the whole system. In addition, the hot-swap function also supports dynamic allocation for storage and computing capability in response to special demands. For example, if the user aims to increase computing performance, a rack chassis with 14 slots may allocate 10 slots to blade servers and 4 to expandable storage apparatus. In one aspect of the present invention, the expandable storage apparatus 3 occupies two slots of the chassis. Depending on the needs, the storage apparatus 3 may only occupy one slot.

The connector 9 communicates to a middle plane 11 of the blade server system 1. The middle plane 11 is a system integration interface allowing the connector 9 to communicate with at least one blade server 15 of the blade server system. In other words, the blade server 15 is accessible to the expandable storage apparatus 3 via the middle plane 11 and the input/output module 13, without of the use of any external lines or devices. Therefore, the expandable storage apparatus 3 is effectively coupled through an input/output module 13 and a middle plane 11 to a blade server 15 within a single blade server system 1 eliminating the need to connect the blade server system 1 to an external storage system. Accordingly, the redundant space, i.e., unoccupied slots in the rack will not be left idle, and the user can allocate a proportion of the storage to computing capabilities based on the demands at that time, without further external storage system(s).

Figure 2:
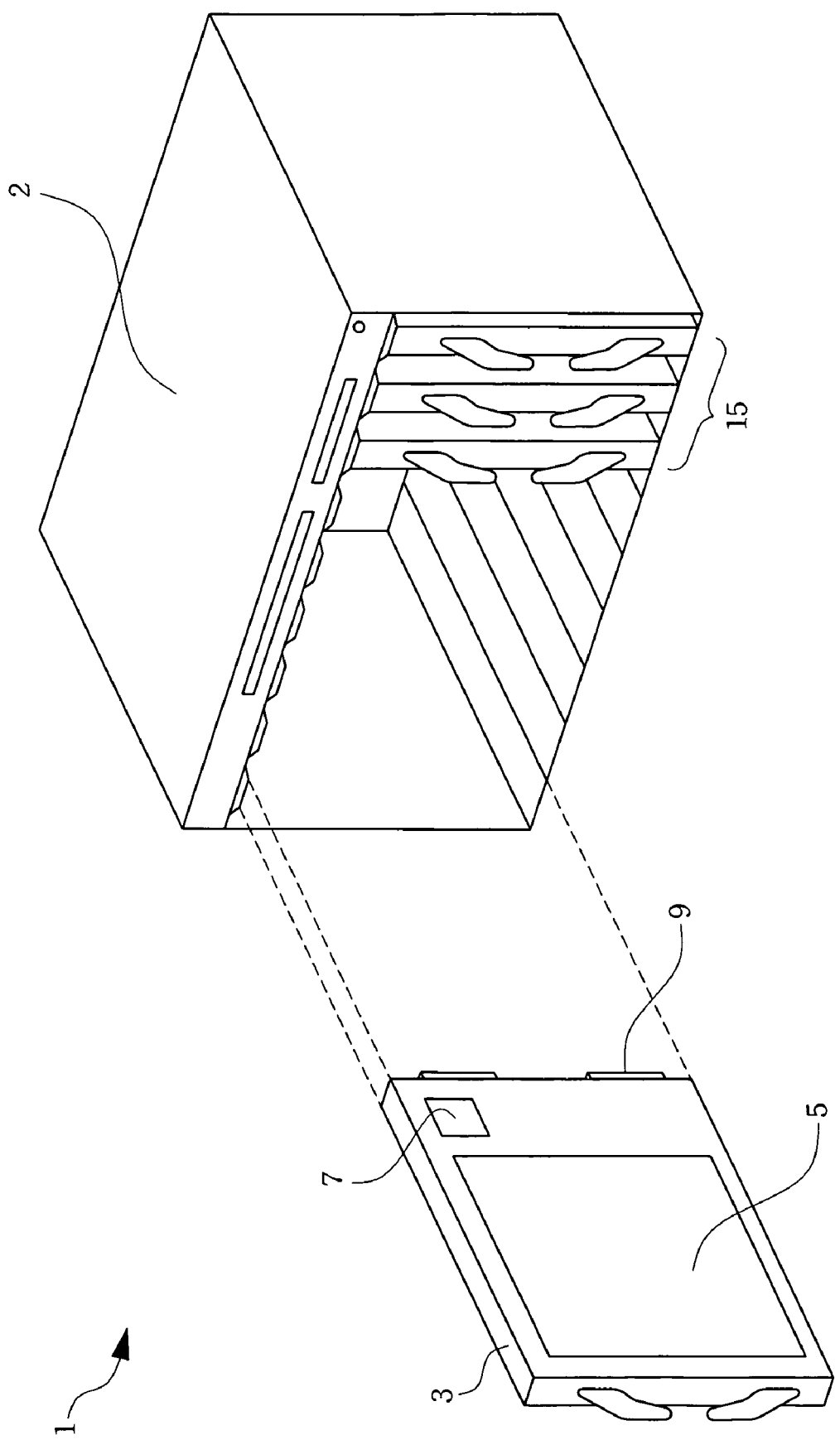
FIG. 2 is an illustrative view showing a relationship between an expandable storage apparatus, blade server and server rack.

FIG. 2 is an illustrative view showing the relationship between the expandable storage apparatus, blade server and a server rack. The remote computer, input/output module and middle plane are not shown in this figure. The type, size and number of the rack 2, expandable storage apparatus 3 and connector 9 are shown and should not be considered as to the only components in the present invention.

As shown in FIG. 2, the blade server system 1 includes the rack 2, at least one blade server 15 and at least one expandable storage apparatus 3 that are compatible with the server rack 2, in which the expandable storage apparatus 3 also includes a storage system 5 for storing desired information which can be accessed by the blade server system 1; a control module 7 to control the access to the storage system 5; and a connector 9 connected to a middle plane 11 of the blade server system 1. As described above, the expandable storage apparatus 3 is compatible in type, outline and interface with the blade server 15 and enables the storage apparatus 3 to be hot swapped or added to the blade server system, without the need for external storage system(s). Therefore, all the slots in the rack can be efficiently used while flexibly allocating a proportion of the storage to computing capability. The amount of unnecessary lines to external devices is thus eliminated or reduced.

It will be apparent to those skilled in the art that various modifications and variations can be made to the structure of the present invention without departing from the scope or spirit of the invention. Accordingly, while the present invention has been disclosed with specific embodiments thereof, it should be understood that other embodiments may fall within the spirit and scope of the invention, as defined by the following claims.

What is claimed is:

1. A storage apparatus for a blade server system having a middle plane and a plurality of blade slots, each blade slot being configured to accommodate a respective blade server inserted therein, the respective blade server having a first interface for connecting to the middle plane, comprising:

a storage system for storing information accessible by the blade server system via the middle plane;

a control module for controlling access to the information stored in the storage system; and a connector having a second interface compatible to the first interface, such that the storage apparatus is swappable with the respective blade server, and can be inserted into at least one of the blade slots and be connected to the middle plane of the blade server system.

2. The storage apparatus of claim 1, wherein the storage system is a RAID (Redundant Arrays of Independent Disks) storage system.

3. The storage apparatus of claim 1, wherein the storage system is a JBOD (Just a Bunch of Disks) storage system.

4. The storage apparatus of claim 1, wherein the control module is controlled by an input/output module within the blade server system.

5. The storage apparatus of claim 4, wherein the input/output module further controls at least one blade server of the blade server system.

6. The storage apparatus of claim 4, wherein the input/output module is connected with a remote computer.

7. The storage apparatus of claim 1, wherein the connector is a hardware structure.

8. The storage apparatus of claim 7, wherein the hardware structure is a slot structure.

9. The storage apparatus of claim 7, wherein the hardware structure is designed to have hot-swap support.

10. The storage apparatus of claim 1, wherein the middle plane is a system integration interface communicates between the connector and at least one blade server of the blade server system.

11. A blade server system comprising:

a server rack;

a middle plane disposed in the server rack;

a plurality of blade servers inserted in the server rack, each blade server having a first interface for connecting to the same middle plane; and at least one expandable storage apparatus inserted in the server rack, each including:

a storage system for storing information which can be accessed by the blade server system via the middle plane;

a control module for controlling access to the information in the storage system; and a connector having a second interface compatible to the first interface, such that the expandable storage apparatus can be inserted into the server rack and be connected to the middle plane of the blade server system.

12. The blade server system of claim 11, wherein the storage system is a RAID (Redundant Arrays of Independent Disks) storage system.

13. The blade server system of claim 11, wherein the storage system is a JBOD (Just a Bunch of Disks) storage system.

14. The blade server system of claim 11, wherein the control module is controlled by an input/output module within the blade server system.

15. The blade server system of claim 14, wherein the input/output module further controls the plurality of blade servers of the blade server system.

16. The blade server system of claim 14, wherein the input/output module is connected to a remote computer.

17. The blade server system of claim 11, wherein the connector is a hardware structure.

18. The blade server system of claim 17, wherein the hardware structure is a slot structure.

19. The blade server system of claim 17, wherein the hardware structure is designed to provide hot-swap support.

20. The blade server system of claim 11, wherein the middle plane is a system integration interface for connecting the connector and the plurality of blade servers of the blade server system.

* * * * *